Figure 1:
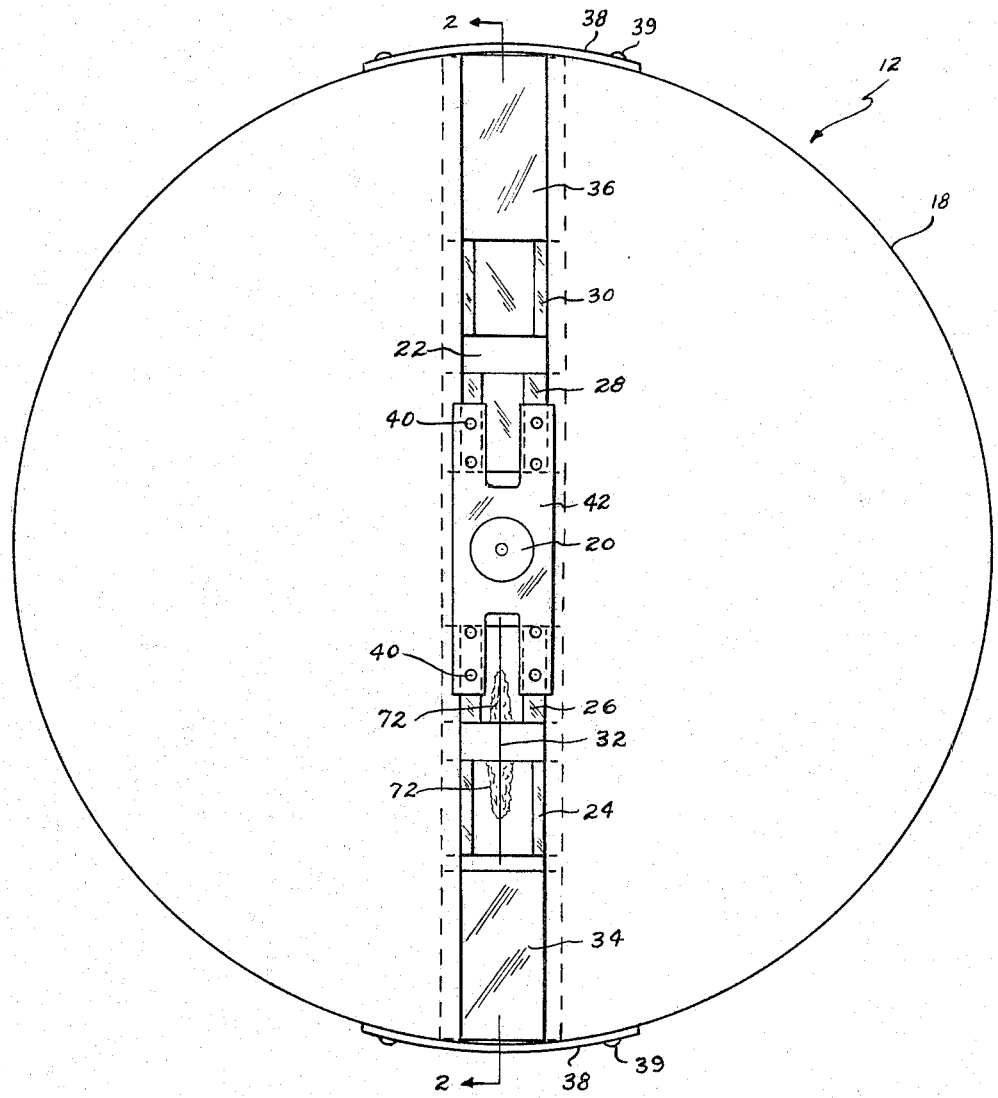

Dec. 13, 1966 W. H. SHELDON 3,290,929
CENTRIFUGAL TENSILE TESTING APPARATUS
Filed Jan. 29, 1965 3 Sheets-Sheet 1

INVENTOR
WILLIAM H. SHELDON

BY Harry A. Herbert Jr.
and Louis E. Say
ATTORNEYS

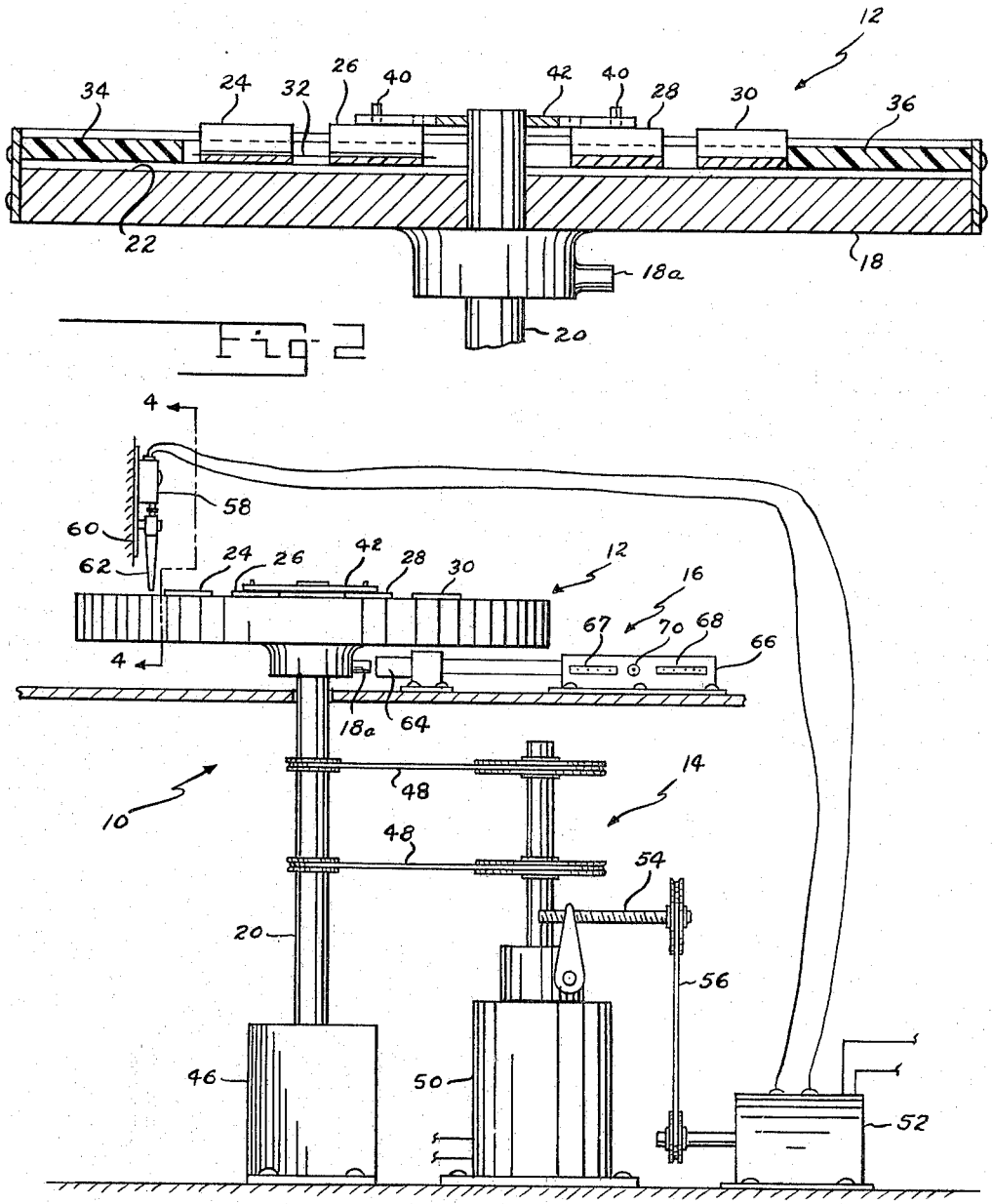

Dec. 13, 1966  W. H. SHELDON  3,290,929
CENTRIFUGAL TENSILE TESTING APPARATUS
Filed Jan. 29, 1965  3 Sheets-Sheet 3
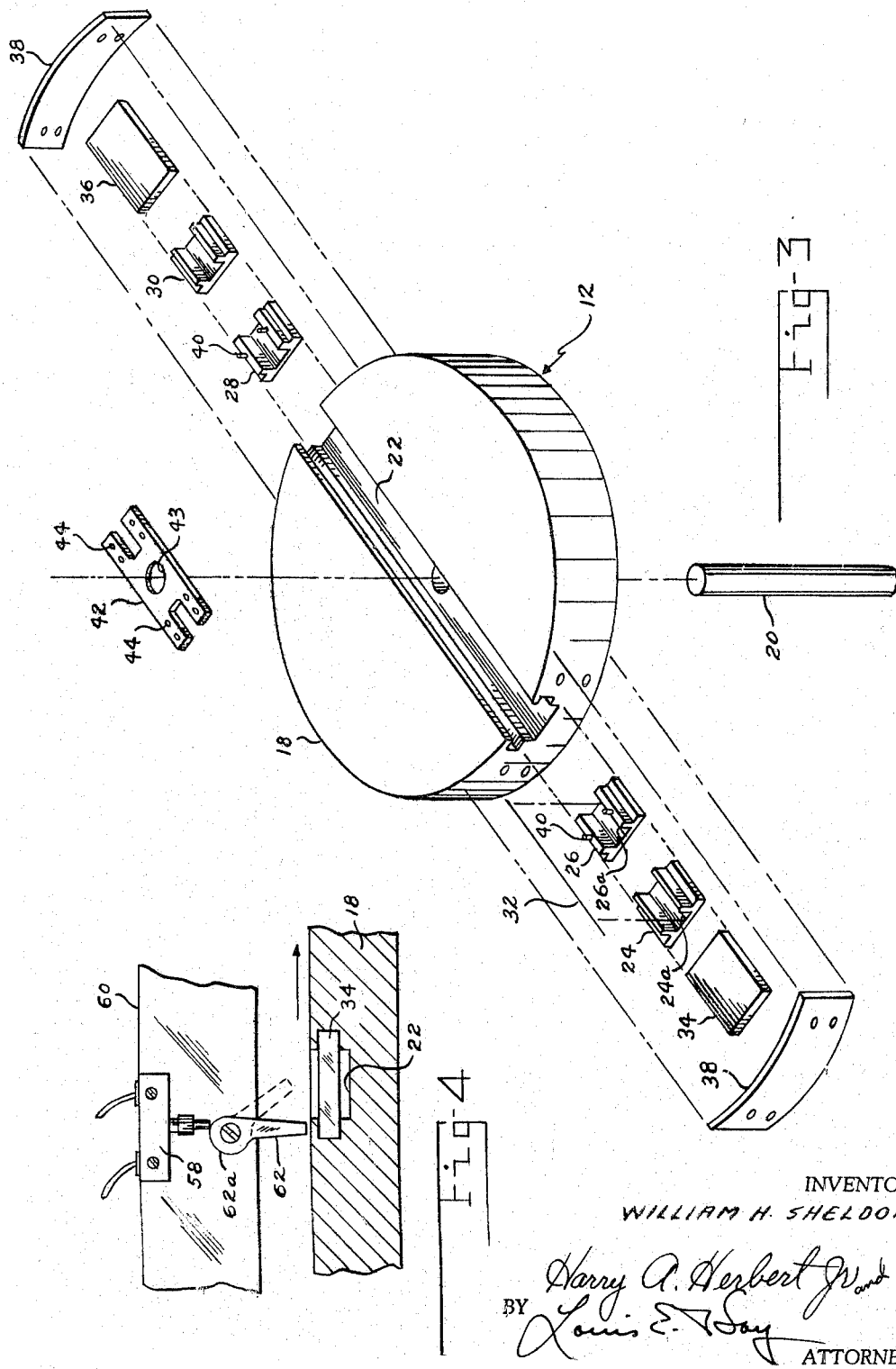
INVENTOR
WILLIAM H. SHELDON
BY Harry A. Herbert Jr. and
Louis E. Day
ATTORNEYS

United States Patent Office 3,290,929
Patented Dec. 13, 1966

3,290,929
CENTRIFUGAL TENSILE TESTING APPARATUS
William H. Sheldon, San Diego, Calif., assignor to the United States of America as represented by the Secretary of the Air Force
Filed Jan. 29, 1965, Ser. No. 429,189
12 Claims. (Cl. 73—95)

This invention relates to apparatus used for testing the physical characteristics of raw material, and more specifically to such apparatus used to determine the tensile strength of elongated material specimens.

The testing apparatus to be disclosed will be found particularly useful in determining the tensile strength of small diameter brittle material such as fiber glass filaments. Although not limited to the testing of brittle materials, the apparatus has certain inherent characteristics which are desirable over commercial testing machines previously available. For this reason, and for purposes of illustration, the tensile testing apparatus constituting this invention will be shown and described as contemplated for use with brittle fibers.

Glass and ceramics, as well as certain plastics, are constantly finding new and increasing usage on space hardware because of their resistance to heat, favorable thermal conductivity, chemical inertness, and a favorable strength to weight ratio. Unlike metals however, most of these materials are extremely brittle, especially to bending moments and to torque, and great handling care must be exercised when conducting routine tests in order to secure accurate results. When conducting tensile tests, for example, great care must be exercised that the filament being tested is maintained in the true position and that no external stress is applied except on the true longitudinal axis of the test specimen.

It is accordingly one prime object of the present invention to provide a tensile testing machine which will produce accurate results with brittle materials.

Another object of the present invention is to provide a tensile testing machine having a minimum number of moving parts which influence the accuracy of the machine.

A further object of the present invention is to provide a tensile testing machine for testing brittle enlongated material which will assure accurate longitudinal alignment of the test specimen.

Yet another object of the present invention is to provide a tensile testing apparatus for use with brittle materials in which the test specimens may be accurately located in a minimum amount of time.

A still further object of the present invention is to provide a tensile testing machine in which the test specimen is stressed by means of centrifugal force.

And yet another object of the present invention is to provide a tensile testing machine for use with brittle filament material which will not shatter the filament on rupture in order that the fracture may be given post-test microscopic examinations.

Additional objects, advantages and features of the invention reside in the construction, arrangement and combination of parts involved in the embodiment of the invention as will appear from the following description and accompanying drawings, wherein:

FIG. 1 is a plan view showing the turntable and attached rotating elements of the apparatus, FIG. 2 is vertical section on line 2—2 of FIG. 1, FIG. 3 is an exploded perspective of the elements shown on FIG. 1 and FIG. 2, FIG. 4 is a vertical section on line 4—4 of FIG. 5, and FIG. 5 is a vertical view of the apparatus complete with driving and recording elements.

Referring to FIG. 5, the centrifugal testing apparatus, which will be referred to as apparatus 10, has for its principal subdivisions a turntable assembly 12, a variable speed driving assembly 14 and a counter assembly 16. In simple terms, the apparatus functions by centrifugal force acting on an inertial block of known weight which is slidable in the turntable where it is radially restrained by the filament constituting the test specimen. The speed of the apparatus is increased until the test specimen ruptures; and as will be later shown, by knowing the weight of the inertial block, its radius from the axis of rotation, and the speed of the turntable, the breaking strength of the test specimen may be calculated from a simple formula.

Referring specifically to FIG. 1, FIG. 2 and FIG. 3, the elements constituting the turntable assembly 12 will be described in detail. The turntable assembly has a revolving support platform such as turntable 18 which is joined for horizontal rotation to the upward extending end of vertical drive shaft 20. The revolving support platform need not be of the disc form shown, although this form is preferable for ease of dynamic balance. As best shown on FIG. 3, the upper face of the turntable has a T-shaped slot 22 machined therethrough on the diameter to provide a guide and retaining means for blocks 24, 26, 28 and 30. Both the T-shaped slot and the mating elements of the blocks should be very accurately machined and polished for minimum friction.

Blocks 24 and 26 act as a matched pair on one side of the axis of rotation, and blocks 28 and 30 act as a matched pair on the opposite side. The test specimen, as will be shown, is joined to blocks 24 and 26; blocks 28 and 30 being used to dynamically balance the turntable.

The slot 22 may take any convenient form other than the T-shape shown; in which case the configuration of the blocks would be altered to make them complementary. Likewise, other guiding means may be used within the spirit of this invention; for example: a guide rod may be mounted on the upper face of the turntable. As will be developed hereinafter, blocks 24 and 30 act as inertial blocks and blocks 26 and 28 act as anchor blocks.

The test specimen 32, which may be a fiber glass filament of small diameter (0.003" average), is mounted to bridge across blocks 24 and 26 in a manner which will be disclosed in describing the operation of the apparatus. Radially outward from each pair of blocks are retaining spacers 34 and 36. As shown on the drawings, retaining spacer 36 is slightly longer than retaining spacer 34. The reason for the difference in length will also be disclosed in describing the operation of the apparatus. The blocks and the retaining spacers are retained within the T-shaped slot by closure members 38 which are removably joined to the turntable by means of screws 39. Blocks 26 and 28 each have a pair of upward extending locating pins 40 located to be longitudinally at the mid point of the blocks. An H-shaped connecting link 42 has a central bore 43 for slidably engaging the upper end of drive shaft 20 and a plurality of paired locating holes 44 equally spaced on both sides of the central bore 43 for slidably engaging the locating pins 40 in blocks 26 and 28. By engaging one pair of holes 44 with one of the blocks, and the opposite pair of holes equally spaced from the central bore with the other block, both blocks 26 and 28 will be held in position against radial movement at equal distances from the axis of rotation and at counterbalancing positions; thus acting as anchor blocks. Blocks 24 and 30, being unrestrained, act as inertial blocks.

Referring to FIG. 5, the vertical drive shaft 20 is rotatably journaled in any suitable base structure 46, and is driven through belts 48 by a variable speed motor 50 having an integral reduction gear and an integral speed control. Such an assembly may be purchased from the Century Electric or the General Electric Companies. If desired, the turntable may be directly joined to the shaft extending from the motor. A second, but smaller, variable speed motor 52, which also has an integral reduction gear, rotates lead screw 54 through belt 56. The lead screw 54 engages the movable arm of the integral speed control on motor 50. Although shown in schematic form, the lead screw 54 is actually supported by attaching to motor 50, and longitudinally moves a traveling nut having a protruding pin engaging an elongated slot in the engaging arm of the integral speed control of motor 50. Other well known schemes may be used within the scope of this invention; the only requirement being a means for variably controlling the speed of motor 50.

All the wiring circuits for the above described motors are conventional, and for that reason have been omitted from the drawings and will not be described. The only portion of circuit which performs a unique function is shown on FIG. 4 and FIG. 5. A normally open microswitch 58 is joined to any convenient support 60. A trip lever 62, having a cammed boss 62a, is pivotally mounted on support 60. The trip lever is located at such position that when the trip lever is in the vertical position shown on FIG. 4, the microswitch is closed. When the trip lever is in the position shown by the dotted lines, the microswitch is open. The bottom end of the microswitch is in such position that the retaining spacers 34 and 36 may pass underneath as the turntable rotates. The upward extending elements of the blocks however are sufficiently high that if a block passes when the trip lever is in the downward position, the block will carry the trip lever to the dotted position and thus open the microswitch. The microswitch is in the control circuit of the variable speed motor 52, and has the function of stopping the motor when a block moves the trip lever from its downward position.

The counter assembly 16 may, within the scope of this invention, include any means which will accurately determine the speed of the turntable at the moment the test specimen breaks. For example, a tachometer or a strobe light could be used. The counter illustrated is a magnetic pickup which was used because it was available at the time the apparatus was constructed. The turntable, which normally can be made from any suitable material, was made of aluminum in order to be non-magnetic. A steel slug 18a was attached to the hub of the turntable as shown on FIG. 2 and FIG. 5. The counter used was manufactured by Anadex Instruments Inc. and consists of a magnetic pickup 64 which is electrically connected to a digital counter 66 having a revolution counter 67 and a time interval counter 68. The counter is turned on and off by means of switch 70.

Referring to FIG. 5, the test specimen 32 is placed into small elongated grooves 24a and 26a which are formed to be substantially on the centroid on the upper faces of blocks 24 and 26, as indicated on FIG. 3. The elongated grooves are precisely on the centerline of the T-shaped slot and the center of the blocks in order to insure true longitudinal alignment. Since the test specimen is of very small diameter, the elongated grooves must likewise be very small and may be of arcuate or V-shaped cross section. The test specimen bridges the two blocks by a predetermined distance in order to establish the radius at which block 24, acting as an inertial block, revolves about its axis of rotation. The test specimen is bonded to the blocks by means of red sealing wax 72 as shown on FIG. 1. The sealing wax may be applied without difficulty by using a hot air gun. The spacing between blocks 24 and 26 may be established by using a conventional set block or by means of a linear scale engraved on the turntable to abut the T-shaped slot. Block 24 may be set to rotate at either of two predetermined radii by selecting the holes in the connecting link 42 which are to engage the locating pins 40 in blocks 26 and 28.

As was previously stated, retaining spacer 36 is longer than retaining spacer 34. Also, as shown on FIG. 1 and FIG. 2, block 30 abuts against the inside end of retaining spacer 36, while the test specimen 32 restrains block 24 to be radially inward from the inner end of retaining spacer 34. The difference in length between the two retaining spacers is substantially the gap distance between block 24 and retaining spacer 34.

The trip lever 62, which actuates the microswitch 58 is located to be radially located over the inner end of retaining spacer 36 and the gap between block 24 and retaining spacer 34. It is thus seen that when the trip lever is in the down position shown on FIG. 4, the turntable can revolve without contacting the trip lever. When, however, the test specimen breaks to free block 24, the block will be thrown outward against retaining spacer 34 and the first time the block moves to be under the trip lever, the block will move the trip lever to the dotted position and open the microswitch.

After the test specimen is in place and the trip lever is turned down to close the microswitch, motors 50 and 52 are started. The movement of the lead screw 54 causes the motor 50 to accelerate the turntable until the specimen breaks. When the specimen breaks to free the inertial block 24, the block opens the microswitch which stops motor 52. Motor 50 continues to rotate the turntable at the speed it was rotating when the test specimen broke. Switch 70 on the digital counter is turned on for say 10 seconds and the revolutions of the turntable during this time interval are recorded, one-tenth of which would be the r.p.s. at the time the test specimen broke. After the speed sensing has been taken, the apparatus is brought to a halt, and the lead screw is returned to its initial position by reversing motor 50 for the proper length of time. The fractured ends of the test specimen may be removed by first reheating the sealing wax. The melted sealing wax should be wiped from the blocks in order to prepare the blocks for the next test specimen.

The apparatus may be provided with conventional protective devices such as limit switches on the lead screw. Such devices are well known and do not constitute a portion of this invention.

The connecting link 42 provides a convenient means for testing both weak and strong fibers, using the same block, and without excessive turntable speed. The short radius would normally be used on the weaker or smaller fibers. This also permits a constant distance between the blocks joined to the test specimen. When the radius used is changed, a comparable change is made in the length of the retaining spacers, and the microswitch and trip lever are radially repositioned. The unbalance caused by the difference in position between blocks 24 and 30 before the test specimen ruptures has been found to be negligible.

The force producing rupture of the test specimen is calculated from the basic formula:

$$F = \frac{W(2\pi r n)^2}{gr}$$

Since on any given machine W (weight of inertial block 24) and r (radius) are constants, the formula may be reduced to $$F = \frac{W(4\pi^2 r^2 n^2)}{gr} = \frac{W(4\pi^2 r n^2)}{g} = \frac{(W 39.479 r)}{32.16} \cdot n^2 =$$
$$(1.228 Wr)n^2 = Kn^2$$

The reduced formula, in which K is the machine constant for a given radius, requires only the determination of the r.p.s. at which the filament ruptured.

It is to be understood that the embodiment of the present invention as shown and described is to be regarded as illustrative only and that the invention is susceptible

I claim:

1. A centrifugal tensile testing apparatus for determining the tensile strength of an elongated test specimen and comprising: a support platform journaled for horizontal rotation about a vertical axis and having an elongated radial guide means on a horizontal axis passing through the vertical axis of rotation and extending diametrically to be on both sides of the vertical axis, anchor means circumferentially and radially restrained on said support platform to be at counterbalanced equidistance on opposing sides of the vertical axis and coaxial with the elongated guide means on said support platform, two inertial blocks one each of which is slidably restrained on opposite sides of the vertical axis of rotation of said support platform by the elongated radial guide means on said support platform, at least one of said inertial blocks and the adjacent anchor means being adapted for restraining the two opposing end portions of the unbroken test specimen in parallel relationship to the horizontal axis of said guide means on said support platform, and variable speed drive means operably joined to said support platform for rotating and accelerating said support platform within a known speed range until the test specimen ruptures due to tensile force applied thereon through centrifugal force acting on the vertical block restraining one end of the test specimen.

2. A centrifugal tensile testing apparatus in accordance with claim 1 in which said variable speed drive means includes means for indicating the rotative speed of said support platform at which the test specimen ruptured.

3. A centrifugal tensile testing apparatus for determining the tensile strength of an elongated test specimen and comprising: a support platform journaled for horizontal rotation about a vertical axis and having a horizontal upper face containing an elongated guide slot on a horizontal axis passing through the vertical axis of rotation and extending diametrically to be on both sides of the vertical axis, anchor means restrained within the elongated guide slot of said support platform to be at counterbalanced equidistance on opposing sides of the vertical axis and coaxial with the elongated guide slot in said support platform, two inertial blocks one each of which is slidably restrained on opposite sides of the vertical axis of rotation of said support platform by the elongated guide slot to be radially extended from said anchor means, at least one of said inertial blocks and the adjacent anchor means being adapted for restraining the two opposing end portions of the unbroken test specimen in parallel relationship to the horizontal axis of said guide slot in said support platform, variable speed drive means operably joined to said support platform for rotating and accelerating said support platform within a known speed range until the test specimen ruptures due to tensile force applied thereon through centrifugal force acting on the inertial block restraining one end of the test specimen.

4. A centrifugal tensile testing apparatus in accordance with claim 3 in which said variable speed drive means includes means for indicating the rotative speed of said support platform at which the test specimen ruptured.

5. A centrifugal tensile testing apparatus for determining the tensile strength of an elongated test specimen and comprising: a support platform journaled for horizontal rotation about a vertical axis and having an elongated radial guide means on a horizontal axis passing through the vertical axis of rotation and extending diametrically to be on both sides of the vertical axis, two slidable anchor blocks one each of which is circumferentially restrained by the elongated radial guide means on said support platform to be radially slidable on opposing sides of the vertical axis of rotation of said support platform, a connecting link joining said anchor blocks to be restrained against radial movement on said support platform at counterbalanced equidistance to the vertical axis of rotation of said support platform, two slidable inertial blocks one each of which is slidably restrained on opposite sides of the vertical axis of rotation of said support platform by the radial guide means on said support platform to be radially extended from said anchor blocks, at least one of said inertial blocks and the adjacent anchor block being adapted for restraining the two opposing end portions of the unbroken test specimen in parallel relationship to the horizontal axis of said guide means on said support platform, and variable speed drive means operably joined to said support platform for rotating and accelerating said support platform within a known speed range until the test specimen ruptures due to tensile force applied thereon through centrifugal force acting on the inertial block restraining one end of the test specimen.

6. A centrifugal tensile testing apparatus in accordance with claim 5 in which said variable speed drive means includes means for indicating the rotative speed of said support platform at which the test specimen ruptured.

7. A centrifugal tensile testing apparatus for determining the tensile strength of an elongated test specimen and comprising: a support platform journaled for horizontal rotation about a vertical axis and having a horizontal upper face containing an elongated guide slot on a horizontal axis passing through the vertical axis of rotation and extending diametrically to be on both sides of the vertical axis, two slidable anchor blocks one each of which is restrained within the elongated guide slot of said support platform to be radially slidable on opposing sides of the vertical axis of rotation of said support platform, a connecting link joining said anchor blocks to be restrained against radial movement on said support platform at counterbalanced equidistance to the vertical axis of rotation of said support platform, two slidable inertial blocks one each of which is slidably restrained on opposite sides of the vertical axis of rotation of said support platform by the elongated guide slot in said support platform to be radially extended from said anchor blocks, at least one of said inertial blocks and the adjacent anchor block being adapted for restraining the two opposing end portions of the unbroken test specimen in parallel relationship to the horizontal axis of said guide means on said support platform, and variable speed drive means operably joined to said support platform for rotating and accelerating said support platform within a known speed range until the test specimen ruptures due to tensile force applied thereon through centrifugal force acting on the inertial block restraining one end of the test specimen.

8. A centrifugal tensile testing apparatus in accordance with claim 7 in which said variable speed drive means includes means for indicating the rotative speed of said support platform at which the test specimen ruptured.

9. A centrifugal tensile testing apparatus for determining the tensile strength of an elongated test specimen and comprising: a support platform having a horizontal upper face containing an elongated guide slot therein open at both ends and the horizontal upper face and having a vertical bore therethrough with the axis of the vertical bore intersecting the horizontal axis of the elongated slot, a vertical drive shaft extending through the vertical bore in said support platform and joined thereto with the upper end of said drive shaft extending above the horizontal upper face of said support platform and with the lower end of said drive shaft journaled for rotation about the vertical axis thereof, two slidable anchor blocks one each of which is slidably restrained within the guide slot in said support platform to be radially slidable on opposing sides of said drive shaft, a connecting link joining said anchor blocks to the upper extending end of said drive shaft to be restrained against radial movement on said support platform at counterbalanced equidistance to the axis of rotation of said drive shaft, two slidable inertial blocks of substantially the same weight one each of which is slidably restrained on opposite sides of said drive shaft by the elongated guide slot in said support platform to be radially extended from said anchor blocks, at least one of said inertial blocks and the adjacent anchor block being adapted for restraining the two opposing end portions of the unbroken test specimen in parallel relationship to the horizontal axis of said guide means in said support platform, two closure members one each of which is joined to said support platform for preventing the radial separation of said inertial blocks from said support platform, and variable speed drive means operably joined to said drive shaft for rotating said support platform within a known speed range until the test specimen ruptures due to tensile force applied thereon through centrifugal force acting on the inertial block restraining one end of the test specimen.

10. A centrifugal tensile testing apparatus in accordance with claim 9 in which said variable speed drive means includes means for indicating the rotative speed of said support platform at which the test speciment ruptured.

11. A centrifugal tensile testing apparatus for determining the tensile strength of an elongated test specimen and comprising: a support platform having a horizontal upper face containing an elongated guide slot therein open at both ends and the horizontal upper face and having a vertical bore therethrough with the axis of the vertical bore intersecting the horizontal axis of the elongated slot, a vertical drive shaft extending through the vertical bore in said support platform and joined thereto with the upper end of said drive shaft extending above the horizontal upper face of said support platform and with the lower end of said drive shaft journaled for rotation about the vertical axis thereof, two slidable anchor blocks of substantially the same weight one each of which is slidably restrained within the guide slot in said support platform to be radially slidable on opposing sides of said drive shaft, a connecting link joining said anchor blocks to the upper extending end of said drive shaft to be restrained against radial movement on said support platform at counterbalanced equidistance to the axis of rotation of said drive shaft, said anchor blocks and said connecting link having cooperating means for setting said anchor blocks at at least two predetermined radii about the axis of rotation of said drive shaft, two slidable inertial blocks of substantially the same weight one each of which is slidably restrained on opposite sides of said drive shaft by the elongated guide slot in said support platform to be radially extended from said anchor blocks, at least one of said inertial blocks and the adjacent anchor block being adapted for restraining the two opposing end portions of the unbroken test specimen in parallel relationship to the horizontal axis of said guide means in said support platform, two closure members one each of which is joined to said support platform for preventing the radial separation of said inertial blocks from said support platform, two retaining spacers one each of which is retained within the guide slot of said support platform on opposite sides of said drive shaft and disposed between one of said inertial blocks and one of said closure members for limiting the outward radial movement of said inertial blocks, and variable speed drive means operably joined to said drive shaft for rotating said support platform within a known speed range until the test specimen ruptures due to tensile force applied thereon through centrifugal force acting on the inertial block restraining one end of the test specimen.

12. A centrifugal tensile testing apparatus in accordance with claim 11 in which said variable speed drive means includes means for indicating the rotative speed of said support platform at which the test specimen ruptured.

No references cited.

RICHARD C. QUEISSER, *Primary Examiner.*